United States Patent [19]

Stoyan

[11] Patent Number: 5,349,395
[45] Date of Patent: Sep. 20, 1994

[54] MULTIPLE FOCUS CORNEAL CONTACT LENS AND METHOD FOR TREATING MYOPIA

[76] Inventor: Nick Stoyan, 3841 Diamante Pl., Encino, Calif. 91436

[21] Appl. No.: 9,322

[22] Filed: Jan. 26, 1993

Related U.S. Application Data

[63] Continuation-in-part of Ser. No. 748,845, Aug. 23, 1991, Pat. No. 5,191,365.

[51] Int. Cl.$^5$ ............................................. G02C 7/04
[52] U.S. Cl. .................. 351/161; 351/160 R; 351/160 H
[58] Field of Search ............ 351/160 R, 160 H, 161, 351/162

[56] References Cited

U.S. PATENT DOCUMENTS

| | | | |
|---|---|---|---|
| 3,831,604 | 8/1974 | Neefe | 351/161 |
| 4,418,991 | 12/1983 | Breger | 351/161 |
| 4,525,043 | 6/1985 | Bronstein | 351/161 |
| 4,765,728 | 8/1988 | Porat et al. | 351/161 |
| 4,952,045 | 8/1990 | Stoyan | 351/161 |
| 4,976,534 | 12/1990 | Miege et al. | 351/161 |
| 5,024,515 | 6/1991 | Seidner | 351/161 |

OTHER PUBLICATIONS

Barr, J. T.: "Aspheric Update 1988, Part I", Spectrum, Nov. 1988, pp. 56–60.

*Primary Examiner*—Scott J. Sugarman
*Attorney, Agent, or Firm*—Poms, Smith, Lande & Rose

[57] ABSTRACT

A multiple focus corneal contact lens for use in treating myopia by controlled corneal molding. The lens includes an asymmetric central zone which provides multiple focusing capability to correct both near and far vision. The tear zone is located concentrically around the central zone. The tear zone is integral with the central zone and has a radius of curvature which is smaller than the central zone. The lens also includes a peripheral zone located concentrically around the tear zone wherein the peripheral zone has a radius of curvature equal to or greater than the central zone.

5 Claims, 1 Drawing Sheet

MULTIPLE FOCUS CORNEAL CONTACT LENS AND METHOD FOR TREATING MYOPIA

BACKGROUND OF THE INVENTION

This is a continuation-in-part of my copending patent application Ser. No. 07/748,845 which was filed on Aug. 23, 1991, now U.S. Pat. No. 5,191,365.

1. Field of the Invention

The present invention relates generally to corneal contact lenses and their use in treating myopia. More particularly, the present invention is directed to corneal contact lenses which are shaped to provide gradual altering of the patient's cornea during continued wear to reshape the cornea to reduce the myopic condition.

2. Description of Related Art

Myopia, also known as nearsightedness, is a condition where the radius of curvature of the cornea is smaller than normal. Individuals with this condition have difficulty in focusing on distant objects because the cornea the curved too sharply to provide adequate focusing. Myopia is a common condition for which no entirely suitable permanent treatment has been developed.

One approach to correcting myopia is through surgical reshaping of the cornea. However, such surgical procedures have not been entirely proven and there is some question as to the permanency of the surgically altered lens shape.

Another approach is to alter the corneal shape by wearing corneal contact lenses which are designed to continually exert pressure on selected locations of the cornea to gradually force or mold the cornea into the desired normal corneal curvature. A retainer lens is then worn on a part time basis to prevent the cornea from returning to its original shape. This method of treatment is commonly referred to as orthokeratology. The success of any treatment by orthokeratology is dependent upon the shape and structure of the corneal contact lens.

My prior U.S. Pat. No. 4,952,045 discloses a contact lens which is specifically designed for use in treating myopia. The lens includes a central zone, a tear zone located concentrically around the central zone and an outer peripheral zone which is located concentrically around the tear zone. This lens is designed specifically so that the radius of curvature of the tear zone is smaller than the radius of curvature for both the central zone and peripheral zone. I discovered that this corneal lens configuration is useful in changing the shape of the myopic cornea to that of a normally shaped cornea. In addition, the sharper curve of the tear zone provides a ring-shaped area where tear fluid is concentrated between the lens. and cornea.

Although the corneal contact lens disclosed in U.S. Pat. No. 4,952,045 is well-suited for its intended purpose, there is continual need for improvement of the design of such a lens to make it better suited for use in treating myopia. For example, in many situations myopic patients require a multiple focus lens, such as a bifocal lens, to provide adequate near and far vision. It would be desirable to provide such people with a multiple focus lens which also includes the features of my prior lens.

SUMMARY OF THE INVENTION

In accordance with the present invention, a corneal contact lens for treating myopia is disclosed wherein the lens is a multiple focal lens which is designed for patients requiring both near and far vision correction. The lens of the present invention is based upon the lens disclosed in U.S. Pat. No. 4,952,045 wherein the corneal contact lens includes a central zone and a tear zone having a radius of curvature which is smaller than that of the central zone. The present invention involves shaping the central zone so as to form an aspheric portion of the lens which provides a multiple focus or correction zone. As a feature of the present invention, the aspheric shape of the multiple focus zone provides bifocal correction for both near and far vision.

As another feature of the present invention, the central zone is aspherically shaped and the relative diameter of the central zone is increased with respect to the tear zone and the outer peripheral zone. This increases the visual zone to provide multiple focusing over a larger area to enhance visual correction.

The above described and many other features and attendant advantages of the present invention will become better understood by reference to the following detailed description when viewed in conjunction with the accompanying drawings.

DETAILED DESCRIPTION OF THE PREFERRED EXEMPLARY EMBODIMENTS

Figures 1, 2:
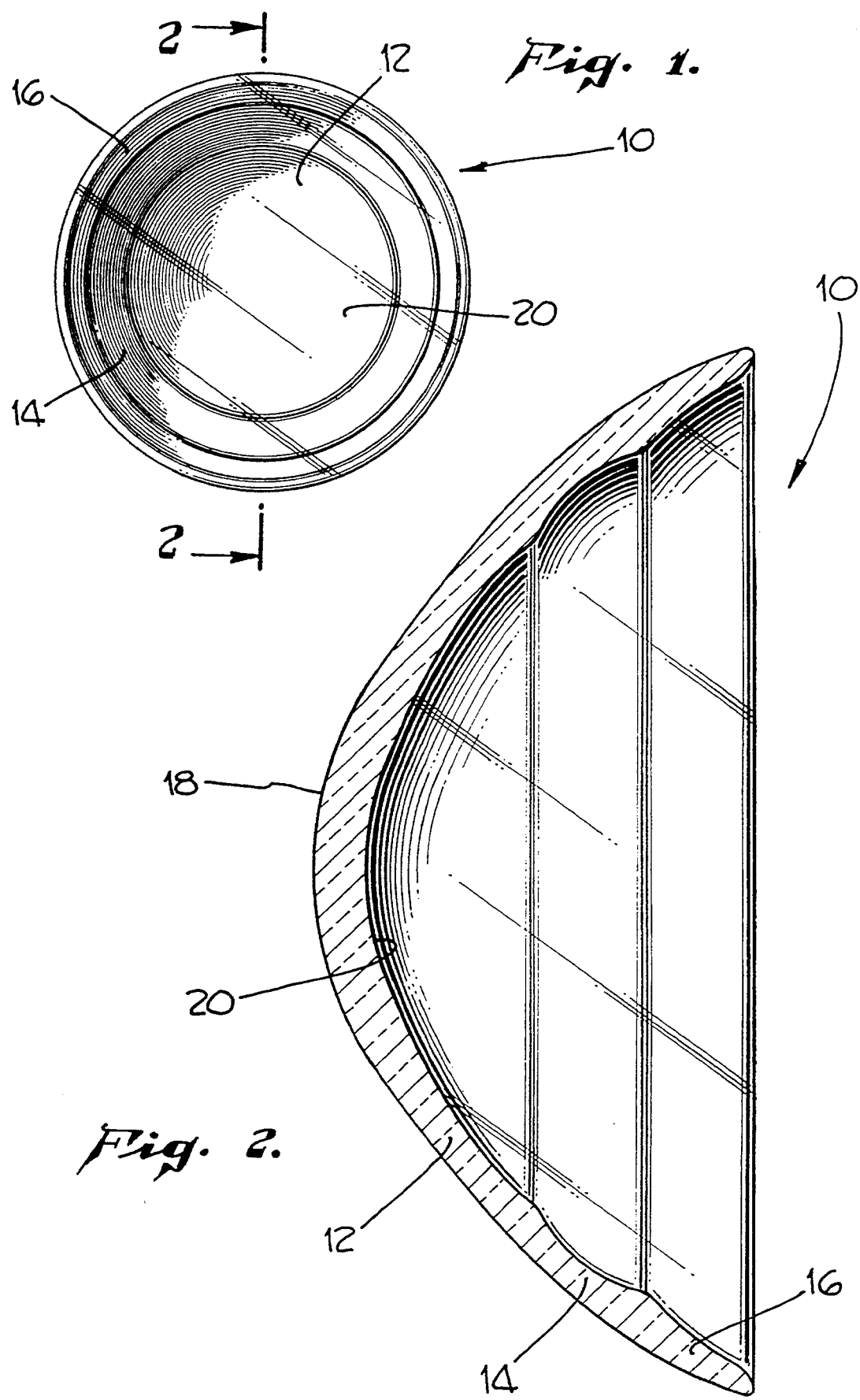
FIG. 1 is a rear view of a preferred exemplary corneal contact lens in accordance with the present invention.
FIG. 2 is a sectional side view of a preferred exemplary corneal contact lens in accordance with the present invention.

The present invention is an improvement upon my prior U.S. Pat. No. 4,952,045. The contents of my prior patent is hereby incorporated by reference.

A preferred exemplary corneal contact lens in accordance with the present invention is shown generally at 10 in FIGS. 1 and 2. The lens 10 includes a central portion or zone 12, a tear portion or zone 14 and a peripheral portion or zone 16. The overall dimension of the lens 10 are within the normal ranges for corneal contact lenses. The outside diameter of the lens is typically between about 5 to 20 millimeters with other diameters being possible in special cases. In general, most lenses will have overall diameters in the neighborhood of 10 millimeters.

The lens has an anterior surface 18 which is shaped in the same manner as conventional contact lenses. The anterior surface 20 is shaped to provide the central zone 12, tear zone 14 and peripheral zone 16 as will be described in detail below. The lateral thickness of the lens 10 will vary since the anterior surface curve 18 does not have to match the various curves of the posterior surface 20. The lateral thickness of the lens will vary depending upon a number of factors including the corrective prescription of the lens and the overall diameter. The relationship between lens thickness and the lens prescription are well known by those skilled in the art.

In accordance with the present invention, the curve of the posterior surface 20 in the central zone 12 is aspheric and produces an aspheric central zone 12 which provides multiple focusing of light as it passes through the lens and into the wearers eye. The eccentricity of the aspheric cure is between 0.04 to 1.5 Eccentricities on the order of about 0.10 are preferred.

The posterior surface of the central zone 12 has a radius of curvature which gradually increases from a minimum of 4 to a maximum of 20 as one moves from the center of the central zone 12 to the perimeter of the zone. The anterior surface of the central zone 12 has a radius of curvature which may or may not match the radius of curvature of the posterior 20, i.e. the anterior surface may be spheric or aspheric if desired. The central zone 12 of the lens is aspheric as shown in FIG. 2 and provides multiple focal points. In addition, the central zone 12 has a diameter which is maximized to enhance the correction of vision provided by the multiple focal points. Diameters on the order of about 6 to 20 millimeters are preferred with 7 to 10 millimeters being most preferred.

The tear zone 14 forms a ring around the optical zone 12 and is integral therewith. The chord length of the tear or intermediate zone 14 is between about 0.1 to 2 millimeters. The radius of curvature of the tear zone 14 is between about 0.1 to 12 millimeters. The preferred ranges are from 0.2 to 3 millimeters for the chord length and 6 to 9 millimeters for the radius of curvature. The radius of curvature may be spherical or aspheric. Aspheric curves are preferred for the tear zone 14 with the range of eccentricities being on the order of −1.0.

As disclosed in detail in my prior U.S. Pat. No. 4,952,045, an important feature is that the radius of curvature of the tear zone 14 must be smaller than the radius of curvature for the central zone 12. This creates a zone of increased curvature around the central zone 12 which provides desirable reshaping of the cornea. In addition, a circular tear channel or duct is formed between the tear zone 14 and the eye to provide a concentrated circular zone or reservoir of tear fluid which helps position the lens carefully on the cornea and enhances lens wearing comfort. Preferably, the radius of curvature of the tear zone will be between 0.5 millimeter and 1.0 millimeter less than the smallest radius of curvature of the central zone 12.

The peripheral zone 16 is integral with the remainder of the lens in that it is preferably machined or molded from the same piece of polymer material. The peripheral zone 16 has a radius of curvature of between about 4 to 20 millimeters. The radius of curvature may be spheric or aspheric. Eccentricities on the order of about 1 to 2 are preferred. The chord length of the ring defined by the peripheral zone 16 is between about 0.1 to 2 millimeters. The preferred ranges are 8 to 15 millimeters for the radius of curvature and 0.1 to 1.0 millimeter for the chord length.

The posterior surface of the peripheral zone 16 may have a single radius of curvature or it may be divided into a plurality of smaller peripheral curves. The radii of curvature of the plurality of peripheral curves may be gradually increased from the radially inward curve to the radially outermost curve. Preferably, the innermost peripheral curve will have a radius of curvature slightly above the radius of curvature for the tear zone 14. The outermost peripheral curve will have the largest radius of curvature.

The chord length or optical zone for each of the peripheral curves is preferably between about 0.05 millimeter and 0.1 millimeter. The number of peripheral curves present can be varied if desired; however, it is preferred that at least 5 curves be provided in the peripheral zone 16. In addition, the chord length of each of the peripheral curves may be varied. Alternatively, the innermost peripheral curve and outermost peripheral curve may have chord lengths which are longer than the peripheral curves located therebetween. The number of peripheral curves in the posterior surface can be increased to provide a continuous aspheric peripheral zone in which the radius of curvature gradually increases towards the outer radial edge of the lens in the same manner as the central zone.

The lens 10 can be made according to any of the known machining or molding processes which allow variable radii of curvature lenses to be formed. The preferred procedure is to machine the lens from buttons or disks as is commonly known. The materials used in making the lens 10 can be any of the conventional polymers used in oxygen permeable hard, semi-hard and soft hydrogel corneal contact lenses. These materials include a variety of silicone and fluorine substituted acrylates and the soft hydrogel or silicone lens materials used in contact lenses. If desired, the three zones 12, 14, and 16 can be made from the same lens material or different lens materials. For example, a suitable lens 10 could include a hard plastic central zone 12 and peripheral zone 16 while having a semi-hard or soft tear zone 14. Additional control over corneal reshaping or molding is provided by this ability to vary the hardness of the individual zones.

As an example, a preferred exemplary lens has an overall diameter of 11 millimeters. The central zone 12 has a diameter of 7.8 millimeters. The radius of curvature for the anterior surface of the central zone 12 is 8.00. The eccentricity is 1.0 and the prescription is −2.00. The tear zone 14 has an optical zone or chord length which is 1.0 millimeters long and a posterior surface with a radius of curvature of 7.30 millimeters. The eccentricity of the tear zone posterior surface is −1.0. The peripheral zone 16 has and optical zone or chord length which is 0.6 millimeter long and a radius of curvature for the posterior surface of 11.0 millimeters. The radius of curvature for the anterior surfaces of the lens are matched to the posterior surfaces. The exemplary lens provides bifocal vision with a correction of about +1.5.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. A multiple focus corneal contact lens having a posterior surface for contact with the cornea of an eye and an anterior surface, said corneal contact lens comprising:

an aspheric central zone having a central zone radius of curvature and a central zone periphery; wherein said radius of curvature increases from the center of said central zone to said periphery to provide for multiple focusing of light passing through said corneal contact lens into said eye and wherein the periphery of said aspheric central zone has a diameter of between 6 to 20 millimeters;

a tear zone located concentrically around said central zone and having a tear zone radius of curvature and a tear zone radial thickness, wherein said tear zone radius of curvature is smaller than said central zone radius of curvature;

a peripheral zone located concentrically around said tear zone, said peripheral zone being integral with said tear zone and having a peripheral zone radius of curvature wherein said peripheral zone radius of curvature is greater than or equal to said central zone radius of curvature.

2. A multiple focus corneal contact lens according to claim 1 wherein said peripheral zone comprises a plurality of peripheral rings each having a different radius of curvature wherein the radius of curvature of said peripheral rings increases from the radially inward peripheral ring to the radially outward peripheral ring.

3. A multiple focus corneal contact lens according to claim 1 wherein the radius of curvature of said tear zone is aspheric.

4. A multiple focus corneal contact lens according to claim 1 wherein the radius of curvature of said peripheral zone is aspheric.

5. A multiple focus corneal contact lens according to claim 4 wherein the radius of curvature of said peripheral zone is aspheric.

* * * * *